US010747602B1

(12) United States Patent
Salamon (10) Patent No.: US 10,747,602 B1
(45) Date of Patent: Aug. 18, 2020

(54) USER DATA AVAILABILITY CONFIRMATION SYSTEM AND METHOD

(71) Applicant: EMC Corporation, Hopkinton, MA (US)

(72) Inventor: Victor Salamon, Edmonton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 120 days.

(21) Appl. No.: 15/200,988

(22) Filed: Jul. 1, 2016

(51) Int. Cl.
 *G06F 11/00*   (2006.01)
 *G06F 11/07*   (2006.01)

(52) U.S. Cl.
 CPC ...... *G06F 11/0769* (2013.01); *G06F 11/0721* (2013.01)

(58) Field of Classification Search
 CPC ............ G06F 11/0751; G06F 11/0754; G06F 11/0757; G06F 11/076; G06F 11/0769; G06F 11/3034; G06F 11/3037; G06F 11/3065; G06F 11/3086
 See application file for complete search history.

(56) References Cited

U.S. PATENT DOCUMENTS

| | | | | |
|---|---|---|---|---|
| 7,054,790 B1 * | 5/2006 | Rich | ................... | G06F 11/3419 360/78.06 |
| 7,082,463 B1 * | 7/2006 | Bradley | .............. | H04L 41/5003 709/223 |
| 7,610,523 B1 * | 10/2009 | Singh | ..................... | G11C 29/42 365/200 |
| 7,823,138 B2 * | 10/2010 | Arguelles | .............. | G06F 9/5027 714/100 |
| 7,840,944 B2 * | 11/2010 | Brunswig | ........... | G06F 11/3688 714/38.1 |
| 8,065,133 B1 * | 11/2011 | Asbridge | .............. | G06F 11/261 703/23 |
| 8,191,044 B1 * | 5/2012 | Berlik | ................. | G06F 11/3672 717/102 |
| 8,775,549 B1 * | 7/2014 | Taylor | ................. | H04L 67/1097 707/609 |
| 8,880,801 B1 * | 11/2014 | Robins | ............... | G06F 12/0246 711/114 |
| 8,966,098 B2 * | 2/2015 | Jibbe | ................... | G06F 11/2247 709/227 |
| 2010/0058366 A1 * | 3/2010 | Swildens | ............ | G06F 11/3414 719/329 |
| 2010/0223306 A1 * | 9/2010 | Liu | ..................... | G06F 9/44505 707/822 |
| 2010/0257306 A1 * | 10/2010 | Kawaguchi | .......... | G06F 3/0616 711/103 |
| 2012/0239855 A1 * | 9/2012 | Tootoonchian | ..... | G06F 12/0246 711/103 |
| 2013/0212427 A1 * | 8/2013 | Franceschini | .... | G11C 29/56008 714/6.13 |
| 2015/0100946 A1 * | 4/2015 | Brunswig | .......... | G06F 11/3664 717/124 |
| 2016/0170823 A1 * | 6/2016 | Miller | ................. | G06F 11/0772 714/56 |

\* cited by examiner

*Primary Examiner* — Elmira Mehrmanesh
(74) *Attorney, Agent, or Firm* — Brian J. Colandreo; Mark H. Whittenberger; Holland & Knight LLP (57) ABSTRACT

A method, computer program product, and computing system for defining user data that needs to be available to a user application. The user data is stored within a data array. It is determined whether the user data is available to the user application. If the user data is not available to the user application, notice concerning the unavailability of the user data is provided.

18 Claims, 3 Drawing Sheets

USER DATA AVAILABILITY CONFIRMATION SYSTEM AND METHOD

TECHNICAL FIELD

This disclosure relates to data storage systems and, more particularly, to availability of data on those data storage systems.

BACKGROUND

Storing and safeguarding electronic content is of paramount importance in modern business. Accordingly, various methodologies may be employed to protect and distribute such electronic content. For example, data may be stored in a centralized location so that it may be accessible by multiple users. Unfortunately, systems do fail and sometimes this centralized data may become unavailable. Further complicating such failures is that these failures may go undetected and may only become known when the data is actually needed.

SUMMARY OF DISCLOSURE

In one implementation, a computer-implemented method is executed on a computing device and includes defining user data that needs to be available to a user application. The user data is stored within a data array. It is determined whether the user data is available to the user application. If the user data is not available to the user application, notice concerning the unavailability of the user data is provided.

One or more of the following features may be included. Providing notice concerning the unavailability of the user data may include one or more of: notifying the user application and notifying one or more individuals. Defining user data that needs to be available to a user application may include monitoring the user application to identify the user data that needs to be available to the user application. Defining user data that needs to be available to a user application may include processing a configuration file to identify the user data that needs to be available to the user application. Defining user data that needs to be available to a user application may include identifying, via a user interface, the user data that needs to be available to the user application. Determining if the user data is available to the user application may include one or more of: determining if read operations can be performed on the user data, determining if write operations can be performed on the user data, determining a latency quantifier for the user data, and determining a bandwidth quantifier for the user data. The user data may be defined as one or more data blocks or one or more data files.

In another implementation, a computer program product resides on a computer readable medium and has a plurality of instructions stored on it. When executed by a processor, the instructions cause the processor to perform operations including defining user data that needs to be available to a user application. The user data is stored within a data array. It is determined whether the user data is available to the user application. If the user data is not available to the user application, notice concerning the unavailability of the user data is provided.

One or more of the following features may be included. Providing notice concerning the unavailability of the user data may include one or more of: notifying the user application and notifying one or more individuals. Defining user data that needs to be available to a user application may include monitoring the user application to identify the user data that needs to be available to the user application. Defining user data that needs to be available to a user application may include processing a configuration file to identify the user data that needs to be available to the user application. Defining user data that needs to be available to a user application may include identifying, via a user interface, the user data that needs to be available to the user application. Determining if the user data is available to the user application may include one or more of: determining if read operations can be performed on the user data, determining if write operations can be performed on the user data, determining a latency quantifier for the user data, and determining a bandwidth quantifier for the user data. The user data may be defined as one or more data blocks or one or more data files.

In another implementation, a computing system includes a processor and a memory system configured to perform operations including defining user data that needs to be available to a user application. The user data is stored within a data array. It is determined whether the user data is available to the user application. If the user data is not available to the user application, notice concerning the unavailability of the user data is provided.

One or more of the following features may be included. Providing notice concerning the unavailability of the user data may include one or more of: notifying the user application and notifying one or more individuals. Defining user data that needs to be available to a user application may include monitoring the user application to identify the user data that needs to be available to the user application. Defining user data that needs to be available to a user application may include processing a configuration file to identify the user data that needs to be available to the user application. Defining user data that needs to be available to a user application may include identifying, via a user interface, the user data that needs to be available to the user application. Determining if the user data is available to the user application may include one or more of: determining if read operations can be performed on the user data, determining if write operations can be performed on the user data, determining a latency quantifier for the user data, and determining a bandwidth quantifier for the user data. The user data may be defined as one or more data blocks or one or more data files.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
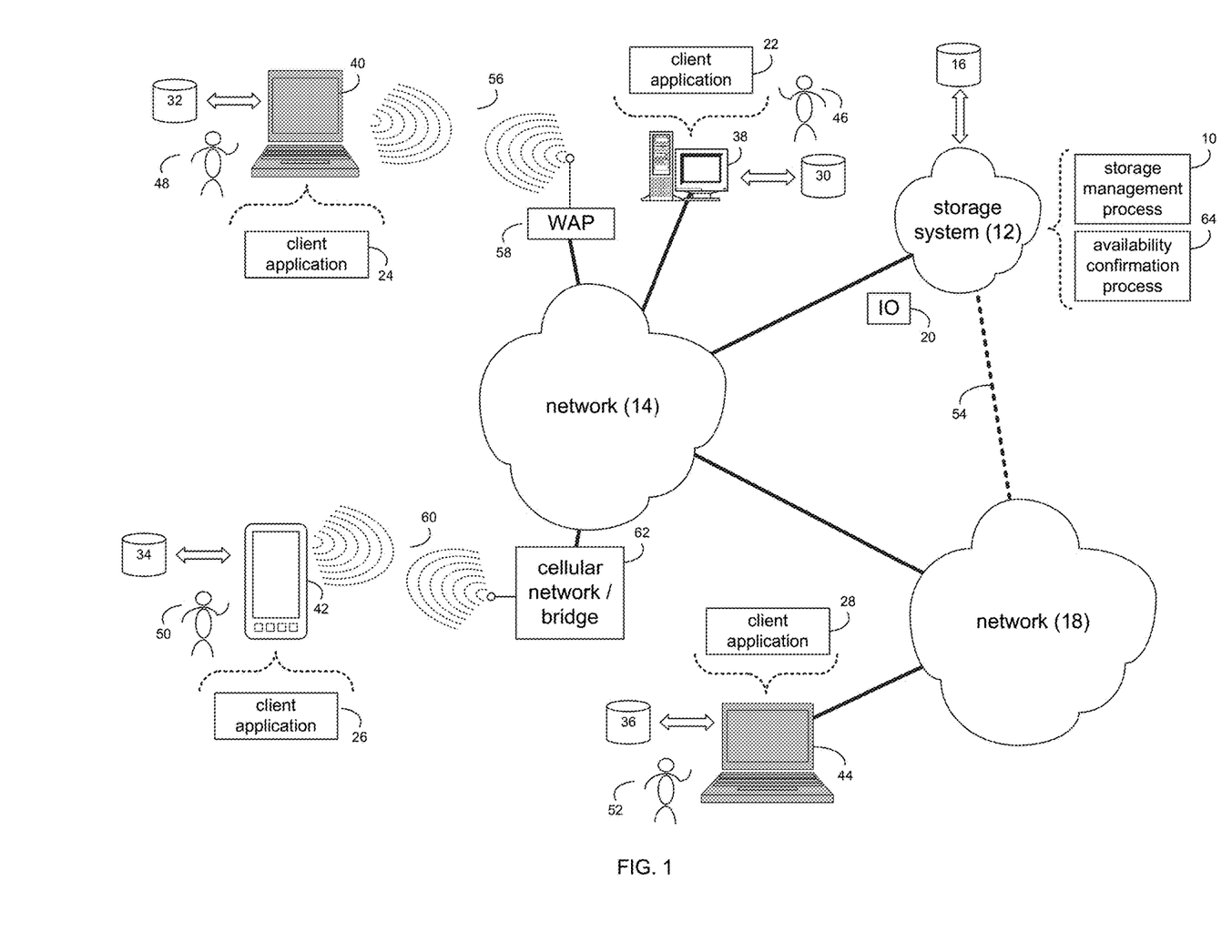
FIG. 1 is a diagrammatic view of a storage system, an availability confirmation process and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
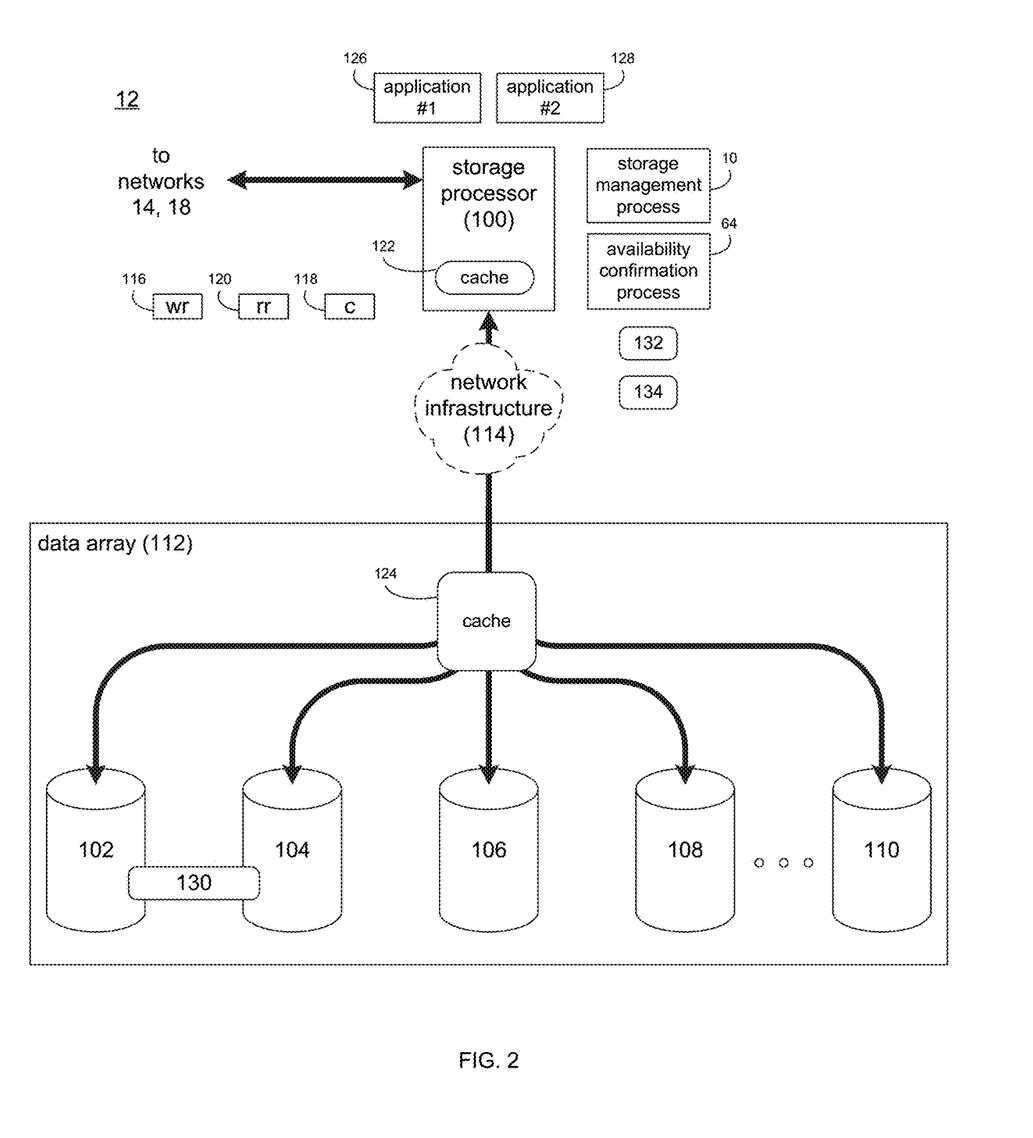
FIG. 2 is a diagrammatic view of the storage system of FIG. 1.

Data Storage System:

Referring also to FIG. 2, there is shown a general implementation of storage system 12. In this general implementation, data storage system 12 may include storage processor 100 and a plurality of storage targets (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5, RAID 6 or RAID 7 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data, wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage device.

Examples of storage targets 102, 104, 106, 108, 110 may include one or more electro-mechanical hard disk drives and/or solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, 110.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Availability Confirmation Process:

Storage system 12 may execute all or a portion of availability confirmation process 64. Availability confirmation process 64 may be configured to confirm the availability of data that is stored within data array 112. As discussed above, storage processor 100 may be configured as an application server. Accordingly, storage processor 100 may serve applications (e.g., applications 126, 128) that may be accessed and utilized by e.g., users 46, 48, 50, 52, wherein data (e.g., user data 130) generated for these users (e.g., users 46, 48, 50, 52) by these applications (e.g., applications 126, 128) may be stored within data array 112.

Examples of applications 126, 128 may include but are not limited to database applications, word processing applications, spreadsheet applications, client management applications, time management applications, sales management applications, and email applications. Examples of user data 130 may include but are not limited to one or more data blocks (e.g., when data is managed at a block level) or one or more data files (e.g., when data is managed at a file system level).

The instruction sets and subroutines of availability confirmation process 64, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

Figure 3:
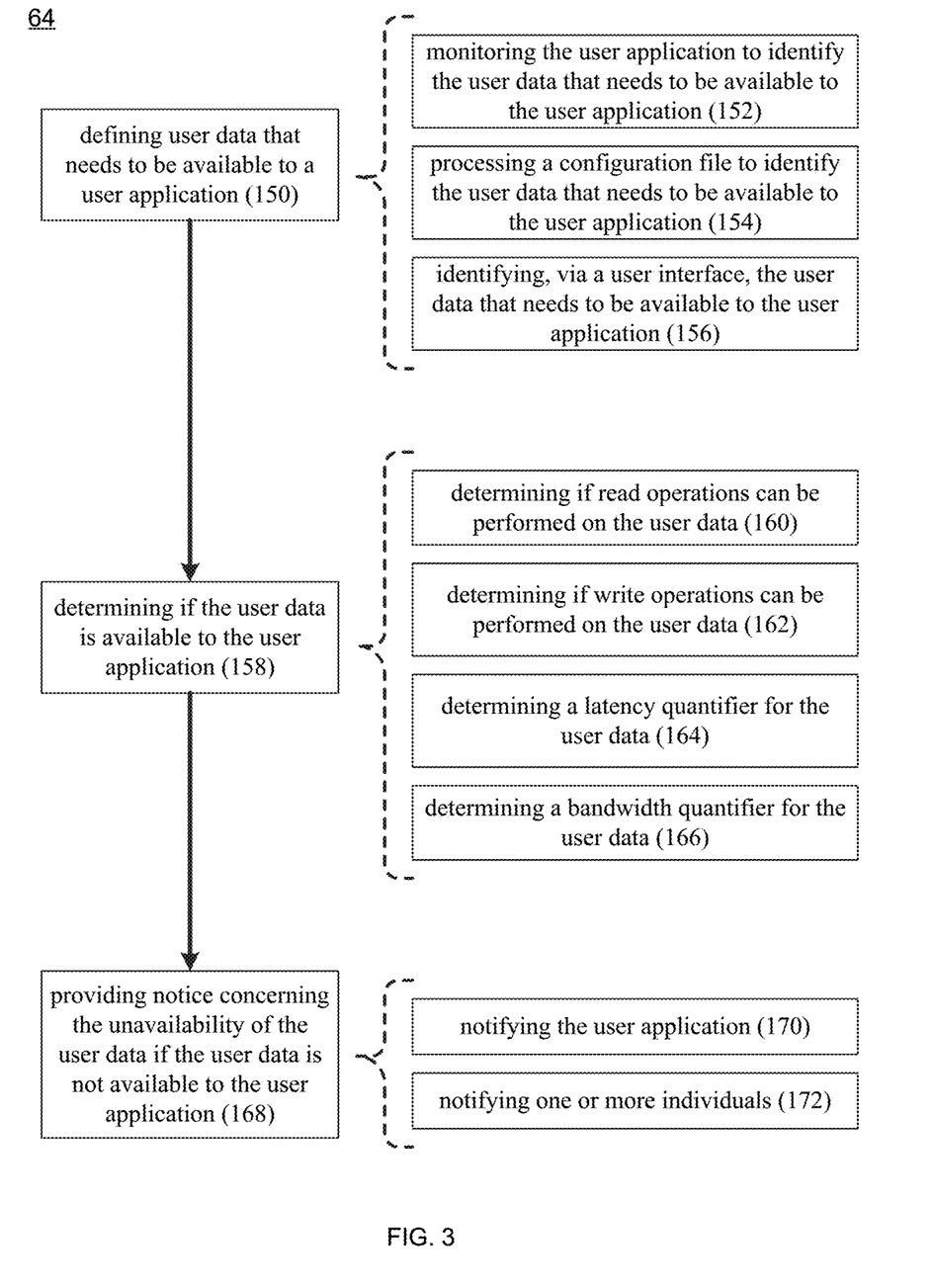
FIG. 3 is a flow chart of the availability confirmation process of FIG. 1.

Referring also to FIG. 3, availability confirmation process 64 may define 150 user data (e.g., user data 130) that needs to be available to a user application (e.g., application 126), wherein user data 130 may be stored within data array 112. For this example, assume that application 126 is a database application and user data 130 is a set of database records that are accessed and utilized by application 126.

When defining 150 user data (e.g., user data 130) that needs to be available to a user application (e.g., application 126), availability confirmation process 64 may monitor 152 the user application (e.g., application 126) to identify the user data (e.g., user data 130) that needs to be available to application 126. Accordingly, availability confirmation process 64 may interface/access application 126 to monitor 152 the user data that application 126 accesses and utilizes, and the location of such data. For example and when monitoring 152 application 126, availability confirmation process 64 may determine that application 126 needs user data 130 to be available, and that user data 130 needs to be positioned within a flash storage device.

Alternative and when defining 150 user data (e.g., user data 130) that needs to be available to a user application (e.g., application 126), availability confirmation process 64 may process 154 a configuration file (e.g., configuration file 132) to identify the user data (e.g., user data 130) that needs to be available to the user application (e.g., application 126). For example, configuration file 132 may be defined by a user/administrator (not shown) of application 126 and may identify the user data (e.g., user data 130) and the type of availability (e.g., availability on a flash storage device) needed by application 126.

Further and when defining 150 user data (e.g., user data 130) that needs to be available to a user application (e.g., application 126), availability confirmation process 64 may identify 156, via a user interface (not shown), the user data (e.g., user data 130) that needs to be available to the user application (e.g., application 126). For example, a user/administrator (not shown) of availability confirmation process 64 may utilize a user interface (not shown) that allows the user/administrator to identify 156 the user data (e.g., user data 130) and the type of availability (e.g., availability on a flash storage device) needed by application 126.

Once availability confirmation process 64 defines 150 the user data (e.g., user data 130), availability confirmation process 64 may determine 158 if the user data (e.g., user data 130) is available to the user application (e.g., application 126). When determining 158 if user data 130 is available to application 126, availability confirmation process 64 may perform this determination at a user defined/administrator defined frequency. For example, this determination may be made once per hour, once per day or once per week.

When determining 158 if the user data is available to the user application, availability confirmation process 64 may determine 160 if read operations can be performed on the user data. For example, availability confirmation process 64 may execute one or more read operations (e.g., the reading of actual data) on user data 130 to determine 160 if these one or more read operations can be performed.

Additionally/alternatively, when determining 158 if the user data is available to the user application, availability confirmation process 64 may determine 162 if write operations can be performed on the user data. For example, availability confirmation process 64 may execute one or more write operations (e.g., the writing of test data) on user data 130 to determine 160 if these one or more write operations can be performed.

Additionally/alternatively, when determining 158 if the user data is available to the user application, availability confirmation process 64 may determine 164 a latency quantifier for the user data. For example, availability confirmation process 64 may execute one or more ping operations (e.g., by providing a test ping) on user data 130 to determine 164 if the latency associated with user data is within acceptable limits (e.g., below an acceptable number of milliseconds).

Additionally/alternatively, when determining 158 if the user data is available to the user application, availability confirmation process 64 may determine 166 a bandwidth quantifier for the user data. For example, availability confirmation process 64 may execute one or more read and/or write operations on user data 130 to determine 166 the rate at which user data 130 may be written and/or read and if it is within acceptable limits (e.g., above an acceptable number of megabytes per second).

While the process of determining 158 if user data 130 is available to application 126 is described above as including determining 160 if read operations can be performed and determining 162 if write operations can be performed, this is for illustrative purposes only and is not intended to be a limitation of this disclosure, as other configurations are available and are considered to be within the scope of this disclosure. For example, atomic read-write operations and/or SCSI reservations may be performed on user data 130 to determine 158 its availability to application 126.

If availability confirmation process 64 determines 158 that the user data (e.g., user data 130) is not available to the user application (e.g., application 126), availability confirmation process 64 may provide 168 notice (e.g., notice 134) concerning the unavailability of the user data (e.g., user data 130) so that e.g., the situation may be resolved.

When providing 168 notice (e.g., notice 134) concerning the unavailability of the user data (e.g., user data 130), availability confirmation process 64 may notify 170 the user application (e.g., application 126). Additionally/alternatively, availability confirmation process 64 may notify 172 one or more individuals, such as the user (not shown) of application 126 and/or the administrator (not shown) of application 126, wherein such notice (e.g., notice 134) may be provided via e.g., text message, email, and/or voice mail.

During the above-described procedures, availability confirmation process 64 may lock data 130 to prevent e.g., application 126 from attempting to access data 130 during these procedures. Additionally/alternatively, availability confirmation process 64 may schedule the performance of the above-described procedures during periods of time when it is known that application 126 will not attempting to access data 126.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
monitoring, on the computing device, user data that a user application accesses and utilizes, wherein the user application is a time management application;
defining user data that needs to be available to the user application based upon, at least in part, the monitored user data, wherein the user data is stored within a data array;
determining if the user data is available to the user application at a user-defined frequency, wherein determining if the user data is available to the user application includes determining if the user data is available during one or more periods of time when the user application will not attempt to access the user data; and one or more of:

executing one or more read operations on the user data at the user-defined frequency during the one or more periods of time when the user application will not attempt to access the user data to determine if read operations can be performed on the user data, wherein the one or more executed read operations are separate from read requests associated with the user application, and executing one or more write operations on the user data at the user-defined frequency during the one or more periods of time when the user application will not attempt to access the user data to determine if write operations can be performed on the user data, wherein the one or more executed write operations are separate from write requests associated with the user application;

if the user data is not available to the user application, providing notice concerning the unavailability of the user data; and if the user data is available to the user application, positioning the user data within a flash storage device, wherein positioning the user data within a flash storage device includes writing the user data from a storage processor to the flash storage device in response to the storage processor receiving the user data; and storing coded data within the flash storage device, wherein the coded data includes Reed-Solomon data.

2. The computer-implemented method of claim 1 wherein providing notice concerning the unavailability of the user data includes one or more of:

notifying the user application; and
notifying one or more individuals.

3. The computer-implemented method of claim 1 wherein defining user data that needs to be available to a user application includes:

processing a configuration file to identify the user data that needs to be available to the user application.

4. The computer-implemented method of claim 1 wherein defining user data that needs to be available to a user application includes:

identifying, via a user interface, the user data that needs to be available to the user application.

5. The computer-implemented method of claim 1 wherein determining if the user data is available to the user application includes one or more of:

determining a latency quantifier for the user data; and
determining a bandwidth quantifier for the user data.

6. The computer-implemented method of claim 1 wherein the user data is defined as one or more data blocks or one or more data files.

7. A computer program product residing on a non-transitory computer readable medium having a plurality of instructions stored thereon which, when executed by a processor, cause the processor to perform operations comprising:

monitoring user data that a user application accesses and utilizes, wherein the user application is a client management application;

defining user data that needs to be available to the user application based upon, at least in part, the monitored user data, wherein the user data is stored within a data array;

determining if the user data is available to the user application at a user-defined frequency, wherein determining if the user data is available to the user application includes determining if the user data is available during one or more periods of time when the user application will not attempt to access the user data; and one or more of:

executing one or more read operations on the user data at the user-defined frequency during the one or more periods of time when the user application will not attempt to access the user data to determine if read operations can be performed on the user data, wherein the one or more executed read operations are separate from read requests associated with the user application, and executing one or more write operations on the user data at the user-defined frequency during the one or more periods of time when the user application will not attempt to access the user data to determine if write operations can be performed on the user data, wherein the one or more executed write operations are separate from write requests associated with the user application;

if the user data is not available to the user application, providing notice concerning the unavailability of the user data; and if the user data is available to the user application, positioning the user data within a flash storage device, wherein positioning the user data within a flash storage device includes writing the user data from a storage processor to the flash storage device in response to the storage processor receiving the user data; and storing coded data within the flash storage device, wherein the coded data includes Reed-Solomon data.

8. The computer program product of claim 7 wherein providing notice concerning the unavailability of the user data includes one or more of:

notifying the user application; and
notifying one or more individuals.

9. The computer program product of claim 7 wherein defining user data that needs to be available to a user application includes:

processing a configuration file to identify the user data that needs to be available to the user application.

10. The computer program product of claim 7 wherein defining user data that needs to be available to a user application includes:

identifying, via a user interface, the user data that needs to be available to the user application.

11. The computer program product of claim 7 wherein determining if the user data is available to the user application includes one or more of:

determining a latency quantifier for the user data; and
determining a bandwidth quantifier for the user data.

12. The computer program product of claim 7 wherein the user data is defined as one or more data blocks or one or more data files.

13. A computing system including a hardware processor and memory configured to perform operations comprising:

monitoring user data that a user application accesses and utilizes, wherein the user application is a time management application;

defining user data that needs to be available to the user application based upon, at least in part, the monitored user data, wherein the user data is stored within a data array;

determining if the user data is available to the user application at a user-defined frequency, wherein determining if the user data is available to the user application includes determining if the user data is available during one or more periods of time when the user application will not attempt to access the user data; and one or more of:

executing one or more read operations on the user data at the user-defined frequency during the one or more periods of time when the user application will not attempt to access the user data to determine if read operations can be performed on the user data, wherein the one or more executed read operations are separate from read requests associated with the user application, and executing one or more write operations on the user data at the user-defined frequency during the one or more periods of time when the user application will not attempt to access the user data to determine if write operations can be performed on the user data, wherein the one or more executed write operations are separate from write requests associated with the user application;

if the user data is not available to the user application, providing notice concerning the unavailability of the user data; and if the user data is available to the user application, positioning the user data within a flash storage device, wherein positioning the user data within a flash storage device includes writing the user data from a storage processor to the flash storage device in response to the storage processor receiving the user data; and storing coded data within the flash storage device, wherein the coded data includes Reed-Solomon data.

14. The computing system of claim 13 wherein providing notice concerning the unavailability of the user data includes one or more of:

notifying the user application; and notifying one or more individuals.

15. The computing system of claim 13 wherein defining user data that needs to be available to a user application includes:

processing a configuration file to identify the user data that needs to be available to the user application.

16. The computing system of claim 13 wherein defining user data that needs to be available to a user application includes:

identifying, via a user interface, the user data that needs to be available to the user application.

17. The computing system of claim 13 wherein determining if the user data is available to the user application includes one or more of:

determining a latency quantifier for the user data; and determining a bandwidth quantifier for the user data.

18. The computing system of claim 13 wherein the user data is defined as one or more data blocks or one or more data files.

* * * * *